(12) United States Patent
Bai et al.

(10) Patent No.: US 11,198,109 B2
(45) Date of Patent: Dec. 14, 2021

(54) MIXED METAL SORBENTS FOR $CO_2/H_2O$ DISPLACEMENT DESORPTION

(71) Applicants: ExxonMobil Research and Engineering Company, Annandale, NJ (US); TDA Research, Inc., Wheat Ridge, CO (US)

(72) Inventors: Chuansheng Bai, Phillipsburg, NJ (US); Majosefina Cunningham, Whitehall, PA (US); Patrick P. McCall, Matawan, NJ (US); Hans Thomann, Bedminster, NJ (US); Jeannine Elizabeth Elliott, Superior, CO (US); Vinh Nguyen, Arvada, CO (US)

(73) Assignees: ExxonMobil Research and Engineering Company, Annandale, NJ (US); TDA Research, Inc., Wheat Ridge, CO (US)

( * ) Notice: Subject to any disclaimer, the term of this patent is extended or adjusted under 35 U.S.C. 154(b) by 742 days.

(21) Appl. No.: 15/910,159

(22) Filed: Mar. 2, 2018

(65) Prior Publication Data

US 2018/0250652 A1    Sep. 6, 2018

Related U.S. Application Data

(60) Provisional application No. 62/466,782, filed on Mar. 3, 2017.

(51) Int. Cl.
*B01J 20/04*    (2006.01)
*B01J 20/08*    (2006.01)
(Continued)

(52) U.S. Cl.
CPC ............ *B01J 20/041* (2013.01); *B01D 53/02* (2013.01); *B01J 20/08* (2013.01); *B01J 20/3078* (2013.01);
(Continued)

(58) Field of Classification Search
CPC ...... B01J 20/041; B01J 20/08; B01J 20/3078; B01J 20/3204; B01J 20/3236; B01J 20/3433; B01J 20/3466; B01D 53/02
See application file for complete search history.

(56) References Cited

U.S. PATENT DOCUMENTS 5,935,894 A    8/1999    Kanazirev
9,446,343 B2    9/2016    Elliott et al.
(Continued)

OTHER PUBLICATIONS

International Search Report and Written Opinion issued in related International Application No. PCT/US18/20622 dated May 4, 2018.

*Primary Examiner* — James A Fiorito
(74) *Attorney, Agent, or Firm* — Troutman Pepper Hamilton Sanders LLP

(57) ABSTRACT

The disclosure generally relates to CCS sorbents, particularly for $CO_2/H_2O$ displacement desorption process. The sorbents include an aluminum oxide support that includes two alkali metal salts impregnated on the support. The two alkali metals include a potassium metal salts and a second alkali metal salt which is not potassium. The second metal salt disrupts poisoning effects that degrade sorbent lifetime. The sorbents demonstrate improved $CO_2$ loadings and better $H_2O/CO_2$ ratios, as well as improved stability. Compositions and methods of making are disclosed.

11 Claims, 3 Drawing Sheets

(51) Int. Cl.
  *B01J 20/34* (2006.01)
  *B01J 20/30* (2006.01)
  *B01J 20/32* (2006.01)
  *B01D 53/02* (2006.01)
  *B01D 53/04* (2006.01)

(52) U.S. Cl.
  CPC ....... *B01J 20/3204* (2013.01); *B01J 20/3236* (2013.01); *B01J 20/3433* (2013.01); *B01J 20/3466* (2013.01); *B01D 53/0462* (2013.01); *B01D 2253/1124* (2013.01); *B01D 2253/25* (2013.01); *B01D 2257/504* (2013.01); *B01D 2258/0283* (2013.01); *B01D 2259/40086* (2013.01); *Y02C 20/40* (2020.08)

(56) References Cited

U.S. PATENT DOCUMENTS

| | | |
|---|---|---|
| 9,504,955 B2 | 11/2016 | Elliott et al. |
| 9,527,029 B2 | 12/2016 | Elliott et al. |
| 9,539,540 B2 | 1/2017 | Elliott et al. |
| 2016/0304344 A1 | 10/2016 | Liu et al. |

MIXED METAL SORBENTS FOR CO₂/H₂O DISPLACEMENT DESORPTION

CROSS REFERENCE TO RELATED APPLICATIONS

This application claims the benefit of U.S. Provisional Application No. 62/466,782, filed 3 Mar. 2017, which is entirely incorporated herein by reference.

STATEMENT REGARDING FEDERALLY SPONSORED RESEARCH

Portions of this disclosure were made with government support under Contract No. DE-FE0012870, awarded by the Department of Energy. The government may have certain rights in the invention.

TECHNICAL FIELD

The various embodiments of the disclosure relate generally to processes, methods, and compositions of mixed metal sorbents, particularly mixed alkali sorbents, for $CO_2/H_2O$ Displacement desorption. It is particularly useful for improved sorption desorption and limiting parasitic loss of capacity during sorbent operation.

BACKGROUND

Fossil fuels currently supply the majority of world's energy needs and their combustion is the largest source of anthropogenic carbon dioxide emissions. Carbon dioxide is a greenhouse gas and is believed to contribute to global climate change. Concern over global climate warming has led to interest in capturing $CO_2$ emissions from the combustion of fossil fuels. The quantities of combustion gas produced in electric power generation are large because of the scale of furnaces and turbines utilized. One measure of the scale of these operations is the amount of $CO_2$ produced in a typical 500 Megawatt power plant, for coal fired power generation, the rate of $CO_2$ production is on the order of 100 kg per second; for gas fired power production it is more like 50 kg per second.

$CO_2$ can be removed from combustion flue gas streams by various methods, often referred to a carbon capture and sequestration (CCS.) The challenge for $CO_2$ capture from flue gas is to do it efficiently to minimize the cost. All post-combustion $CO_2$ capture technologies suffer from the disadvantages that the $CO_2$ in the flue gas is present at low pressure (1 atmospheric pressure) and in low concentrations (3 to 15%). A large amount of energy is needed to separate $CO_2$. Developing methods that minimize the amount of energy and other costs will be necessary if $CO_2$ removal from flue gas is to be economical. Methods for the removal of $CO_2$ from flue gas streams include adsorption with a solvent, adsorption with a sorbent, membrane separation, and cryogenic fractionation and combinations thereof. In absorption/adsorption processes to capture $CO_2$, the energy needed to regenerate the sorbent or solvent is also a large cost element.

$CO_2$ displacement desorption process uses a competitive adsorption of $H_2O$ to drive off adsorbed $CO_2$ on sorbent. During $CO_2$ capturing step, $CO_2$ of the flue gas displaces the adsorbed $H_2O$ on the sorbent. Displacement desorption swings the concentrations of $H_2O$ and $CO_2$. It is an isothermal process and has no need for pressure swing.

BRIEF SUMMARY

The various embodiments of the disclosure relate generally to methods for making and compositions of mixed alkali metal sorbents.

An embodiment of the disclosure can be a method for improving the stability of a potassium based CCS sorbent, by preparing the sorbent by 1) impregnating an alkali metal composition on a support 2) drying the impregnated support, and 3) calcining the dried support to form the CCS sorbent. The alkali metal composition can contain potassium and at least one other alkali metal.

In some embodiments, a molar ratio of potassium to other alkali metal can be about 1:4 to 4:1. In some embodiments, the molar ratio of potassium to at least one other alkali metal can be about 1:3 to about 3:1. In some embodiments, the molar ratio of potassium to at least one other alkali metal can be about 1:2 to about 2:1.

In some embodiments, the alkali metal salt can be at least about 10 wt % of the sorbent, as $M_2O$. The alkali metal salt can be at least about 12 wt % of the sorbent, as $M_2O$. In some embodiments, the other alkali metal salt can be lithium or sodium, or can be sodium.

In some embodiments, the other alkali metal salt can be at least two other alkali metal salts. The molar ratio of potassium to a first other metal salt to a second other metal salt can be 4:1:1 to 1:4:1 to 1:1:4.

An embodiment of the disclosure can be a method for preparing a CCS sorbent, comprising impregnating a support with an alkali metal solution; drying the impregnated support; and calcining the dried support to form the CCS sorbent. The alkali metal solution can be potassium and at least one other alkali metal.

In some embodiments, a molar ratio of potassium to other alkali metal can be about 1:4 to 4:1. In some embodiments, the molar ratio of potassium to at least one other alkali metal can be about 1:3 to about 3:1. In some embodiments, the molar ratio of potassium to at least one other alkali metal can be about 1:2 to about 2:1.

In some embodiments, the alkali metal salt can be at least about 10 wt % of the sorbent, as $M_2O$. The alkali metal salt can be at least about 12 wt % of the sorbent, as $M_2O$. In some embodiments, the other alkali metal salt can be lithium or sodium, or can be sodium.

In some embodiments, the other alkali metal salt can be at least two other alkali metal salts. The molar ratio of potassium to a first other metal salt to a second other metal salt can be 4:1:1 to 1:4:1 to 1:1:4.

An embodiment of the disclosure can be a mixed alkali metal CCS sorbent The mixed metal CCS sorbent can include a support and a combination of alkali metal ions impregnated on the support. The combination of alkali metal ions can be potassium and at least one other alkali metal.

In some embodiments, a molar ratio of potassium to other alkali metal can be about 1:4 to 4:1. In some embodiments, the molar ratio of potassium to at least one other alkali metal can be about 1:3 to about 3:1. In some embodiments, the molar ratio of potassium to at least one other alkali metal can be about 1:2 to about 2:1.

In some embodiments, the alkali metal salt can be at least about 10 wt % of the sorbent, as $M_2O$. The alkali metal salt can be at least about 12 wt % of the sorbent, as $M_2O$. In some embodiments, the other alkali metal salt can be lithium or sodium, or can be sodium.

In some embodiments, the other alkali metal salt can be at least two other alkali metal salts. The molar ratio of potassium to a first other metal salt to a second other metal salt can be 4:1:1 to 1:4:1 to 1:1:4.

DETAILED DESCRIPTION

Figure 1:
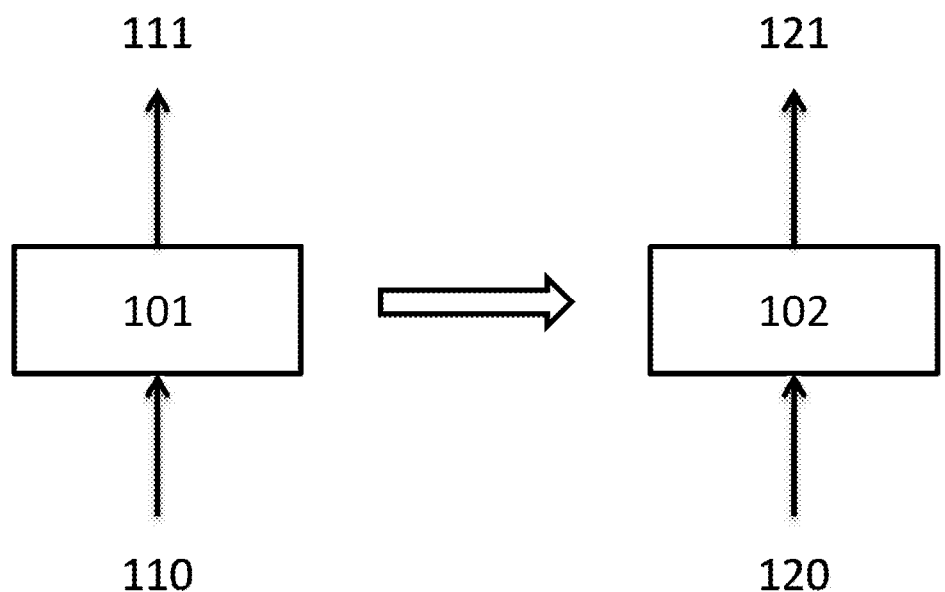
FIG. 1 illustrates a simplified system of $CO_2/H_2O$ displacement desorption system in which a sorbent of the disclosure would be applied, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Embodiments of this disclosure include sorbent for use in a CCS process, particularly $CO_2/H_2O$ displacement desorption, and methods for preparing or improving the stability of those sorbents. FIG. 1 demonstrates a simplified system of $CO_2/H_2O$ displacement desorption, in which a sorbent of this disclosure might be applied. System 100 includes two sorbent bed positions, 101 and 102, in which the sorbents of this disclosure would be placed. Sorbent bed position 101 contains a sorbent that is initially $CO_2$ poor. A $CO_2$ rich stream, 110, e.g. a flue gas feed from a combustion source, passes across sorbent bed 101, which absorbs the $CO_2$, and a $CO_2$ depleted stream exits the bed. Once sorbent bed 101 is saturated, it can move to sorbent bed position 102. A steam feed 120 containing water vapor, can enter the $CO_2$ saturated sorbent bed 102 and cause desorption and displacement of the $CO_2$ from the sorbent. The exit gas stream is then a $CO_2$ rich stream that can then be further processed. Once sorbent bed 102 is regenerated, it can return to position 101. Several applications of this system have been demonstrated, such as in U.S. Pat. Nos. 9,504,955; 9,446,343; 9,539,540; and 9,527,029.

The typical sorbent used in $CO_2/H_2O$ displacement desorption is an alkali metal salt impregnated on an aluminum oxide catalyst, particularly using a potassium salt. $K_2CO_3/Al_2O_3$ is a preferred sorbent currently. However, this sorbent deactivates on stream, which degrades performance of the system. CCS tests showed the sorbents usually had high initial $CO_2$ sorption capacities, but they were gradually losing $CO_2$ sorption capacities on stream. Sorbent aging also leads to higher $H_2O/CO_2$ molar ratios. Potassium carbonate agglomeration on the support surface gives rise to hydroxyl groups resurfacing, which results in more $H_2O$ sorption onto the sorbents.

Characterizations of spent sorbent revealed the formation of poison phase potassium aluminate carbonate $K_2Al_2O_2(CO_3)_2 \cdot 4H_2O$. Under hydrothermal testing condition, $Al_1O_3$ slowly converts to aluminum hydroxide ($\gamma$-AlOOH, boehmite), which reacts easily with $K_2CO_3$ to form $KAlO_2$. The formation of $KAlO_2$ weakens its affinity towards $CO_2$ sorption. One route discovered and discussed herein to mitigate sorbent deactivation can include the addition of a second alkali metal to the sorbent to form binary or ternary alkali metal combinations. For example, the addition of $Na_2CO_3$ to $K_2CO_3/Al_2O_3$ can form a binary (Na+K) sorbent. Addition of $Na_2CO_3$ interrupts the crystallization of potassium aluminate carbonate, which effectively poisons the catalyst by tying up impregnated potassium. The similar counterpart phase with sodium, i.e., $Na_2Al_2O_2(CO_3)_2 \cdot 4H_2O$, does not exist. The sorbents of binary alkali metals (Na+K) supported on alumina showed good CCS stability, high $CO_2$ sorption capacity and low $H_2O/CO_2$ molar ratio. Stable sorbents also need less sorbent regenerations, less CCS unit downtime and less operating costs.

Thus, the disclosure includes a method for improving the stability of a potassium based CCS sorbent, particularly a $CO_2/H_2O$ displacement desorption sorbent. The sorbent can be prepared by impregnating an alkali metal composition on a support, drying the impregnated support, and calcining the dried support to form the CCS sorbent. The disclosure can also include a method for preparing a CCS sorbent, particularly a $CO_2/H_2O$ displacement desorption sorbent, by impregnating a support with an alkali metal solution, drying the impregnated support, and calcining the dried support to form the CCS sorbent.

The disclosure also includes a mixed alkali metal CCS sorbent, particularly a $CO_2/H_2O$ displacement desorption sorbent. The sorbent can include a support and a combination of alkali metal ions impregnated on the support. As noted above, the sorbent can include a combination of alkali metal ions comprises potassium and at least one other alkali metal.

In the methods and sorbents of the disclosure, the alkali metal composition can include potassium and at least one other alkali metal. By alkali metal is meant a Group 1 metal (group IA), including lithium (Li), sodium (Na), potassium (K), rubidium (Rb), and cesium (Cs). The alkali metal composition can include potassium and at least one other alkali metal, such as lithium, sodium, rubidium, or cesium. In some embodiments, the at least one other metal can be lithium, sodium, or cesium. In some embodiments, the at least one other metal can be lithium or sodium. In some embodiments, the at least one other metal can be lithium, or the at least one other metal can be sodium. The at least one other alkali metal can also include embodiments with at least two other alkali metals, i.e. a first other alkali metal that is not potassium, and a second other alkali metal that is not potassium. Exemplary non-limiting pairs of at least one other alkali metal can be lithium and sodium, lithium and rubidium, lithium and cesium, sodium and rubidium, sodium and cesium, or rubidium and cesium. Preferably the pairs can be lithium and sodium, or sodium and cesium.

One of ordinary skill would understand that alkali metal in the context of this disclosure implies the alkali metal cation. As such, the alkali metal composition should be understood to be referred to as an alkali metal ion, or alkali metal cation, or an alkali metal salt, or an alkali salt, alkali ion, or alkali cation.

Because the alkali metal is a cation, it will necessarily have a counterion, i.e. an anion. However, the nature of that anion is not a limiting issue. On the sorbent particularly, the anion can be a carbonate or bicarbonate counterion, or a hydroxyl or oxide anion that is part of the support to which the alkali metal is impregnated upon. Moreover, during preparation of the sorbents, and also as part of the sorbent when the salt is impregnated on the support, the alkali metal cation can have any counteranion one of ordinary skill would use. Nonlimiting examples of the anion can be hydroxides, halides, carbonates, bicarbonates, nitrates, nitrite, phosphate, hydrogen phosphate, dihydrogen phosphate, organic acid salts such as acetate citrate, gluconate, and benzoic acid, etc.

As noted above, the disclosure includes an alkali metal composition that can contain potassium and at least one other alkali metal. The molar ratio of potassium to the other alkali metal can be about 1:5 to 5:1, about 1:4 to 4:1, 1:3 to about 3:1, about 2:3 to about 3:2, or about 1:2 to about 2:1. The molar ratio can be at least 1:5, at least 1:4, or at least 1:3. The molar ratio can be up to 10:1, up to 8:1, or up to 5:1. The ratio disclosed here is potassium:at least one other alkali metal. In some instances where only one other alkali metal is used, i.e. a binary alkali metal combination, then the ratio can be described as potassium to the other metal, e.g. K:Na, K:Li, etc. However, when two other alkali metals are present, i.e. a ternary system, the ratio of potassium to the other alkali metal ions can be presented in two different ways. In one instance, the ratio can be presented as potassium to the sum of the other two alkali metals, e.g. K:(Na+Li). Alternatively, the ternary combination can list the three alkali metal values separately, e.g. K:Na:Li. Thus, the molar ratio of potassium to a first other alkali metal salt to a second other alkali metal salt can be from 4:1:1 to 1:4:1 to 1:1:4. This can also be represented as 4:1:1 to 1:1:1, 1:4:1 to 1:1:1: and 1:1:4 to 1:1:1.

Embodiments of the disclosure can include a % weight value for the alkali metal ions as compared to the total sorbent. The percent weight of alkali metal ion is presented as weight $M_2O$ as a percentage of the total weight of the sorbent. The weight percent of $M_2O$ is defined as the weight of $M_2O$/(the weight of alumina support+the weight of $M_2O$). The weight percent of $M_2O$ usually ranges from 5 wt % to 30 wt %. The alkali metal ions can be at least about 10 wt %, at least about 11 wt %, at least about 12 wt %, at least about 13 wt %, at least about 14 wt %, or at least about 15 wt % of the sorbent. The alkali metal ion content of the sorbent can be up to about 30 wt % of the sorbent.

As discussed above, the initial support can be created onto which the mixed metal alkali salt is impregnated. The initial support can be created by mixing an aluminum oxide create a dough, extruding the dough to create an extrudate, drying and then calcining the extrudate to create the support.

The extrudate can be dried at any temperature that drives off moisture. The extrudate can be dried at greater than about 125° C., greater than about 150° C., greater than about 200° C., or greater than about 250° C. The extrudate can be dried at up to about 500° C., up to about 450° C., up to about 400° C., or up to about 350° C. The extrudate can be dried at a temperature between about 125° C. to about 500° C., about 200° C. to about 400° C., or about 250° C. to about 350° C. As discussed in a co-pending provisional application filed by the same entity on the same day, and titled CALCINATION OF $CO_2/H_2O$ DISPLACEMENT DESORPTION SORBENTS, which is incorporated by reference in its entirety as if set forth herein, the lower calcination temperatures can provide better support for the techniques disclosed herein.

Another embodiment of the disclosure can included the addition of an alkali metal salt to the aluminum compound during mixing to form the dough. This alkali metal salt can be described as an extrudate alkali metal salt since it is contained within the extrudate that is used to make the support. As discussed in a co-pending provisional application filed by the same entity on the same day, and titled HIGH PERFORMANCE $CO_2/H_2O$ DISPLACEMENT DESORPTION SORBENTS AND METHODS OF MAKING SAME, which is incorporated by reference in its entirety as if set forth herein, an alkali metal can be introduced to the aluminum compound during mixing to form the dough, extruded, and dried and calcined to form the support. The extrudate alkali metal salt can be any alkali metal salt. The extrudate alkali metal salt can be a lithium salt, a sodium salt, a potassium salt, or combinations thereof. Preferably the alkali metal salt added to the mixture includes a potassium salt, a sodium salt, or both a potassium salt and a sodium salt.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Example 1

Preparation of 8.6% $K_2O/Al_2O_3$

A comparative example of a traditional alkali aluminum oxide was prepared. $\gamma$-$Al_2O_3$ extrudates (1/20 inch in diameter, quadlobe shape) were used as support to deposit $K_2CO_3$. It has surface area of 250 m²/g, 0.85 cm3/g pore volume and pore size centered on 73 Å. An aqueous solution containing potassium carbonate was prepared by dissolving $K_2CO_3$ in distilled $H_2O$. The sorbent of $K_2O/\gamma-Al_2O_3$ was prepared by an incipient wetness technique. As an example of sample preparation, 13.8 g of potassium carbonate was dissolved in 50.0 g of distilled water. The total solution volume of $K_2CO_3$ adjusted with distilled water was 78.9 ml. 100.0 g of $\gamma-Al_2O_3$ extrudates were impregnated with the solution by incipient wetness. The sample was dried in air at 250° F. for 16 hours and calcined in air at 1000° F. for 3 hours. The furnace was ramped at rate of 5° F./min. During the calcination, the air flow was adjusted to 5 volume/volume solid/minute. The sorbent contains 8.6% $K_2O$ as K loading.

The metal loading is defined as metal oxides, which does not necessarily represent the final state of the metal precursors on alumina support. 11.03% $Na_2O/\gamma-Al_2O_3$ and 15.85% $K_2O/\gamma-Al_2O_3$ were also prepared. The carbonates, acetates and citrates of Na and K were used as precursor compounds for the sorbent preparations.

Example 2

Preparation of 9.9% $K_2O+6.5\%$ $Na_2O/\gamma-Al_2O_3$

The aqueous solution containing sodium and potassium carbonates was prepared by dissolving $Na_2CO_3$ and $K_2CO_3$ in distilled $H_2O$. The sorbent was prepared by incipient wetness. 51.8 g of potassium carbonate and 39.7 g of sodium carbonate were dissolved in 180.0 g of $DI-H_2O$. The total solution volume of $Na_2CO_3$ and $K_2CO_3$ adjusted with distilled water was 259.4 ml. 300.0 g of $\gamma-Al_2O_3$ extrudates were impregnated with the solution by incipient wetness. The sample was dried in air at 250° F. for 16 hours and calcined in air at 1000° F. for 6 hours. The furnace was ramped at rate of 5° F./min. During the calcination, the air flow was adjusted at 5 volume/volume solid/minute. The sorbent contains 9.9% $K_2O$ and 6.5% $Na_2O$ as K and Na loadings. The metal loading is defined as metal oxides, which does not necessarily represent the final state of the metal precursors on alumina support.

Besides Na and K carbonates, the acetates and citrates of Na and K were also used as precursor compounds for the sorbent preparations. Besides $\gamma-Al_2O_2$ extrudates, the following supports were also used in sorbent preparations. $\theta-Al_2O_2$ extrudates were used for sample prep. It has surface area of 126 $m^2/g$, 0.58 $cm^3/g$ pore volume and pore size of 143 Å. $\alpha-Al_2O_3$ extrudates have surface area of 0.8 $m^2/g$, 0.46 $cm^3/g$ pore volume and pore size of 2.8 micron. $\alpha$- and $\theta$-mixture phase $Al_2O_3$ extrudates has surface area of 32 $m^2/g$, 0.15 $cm^3/g$ pore volume and pore size of 155 Å. SiO2 extrudates has surface area of 178 $m^2/g$, 0.86 $cm^3/g$ pore volume and pore size of 202 Å. Carbon extrudates has surface area of 1491 $m^2/g$, pore volume of 0.73 $cm^3/g$, and pore size of 46 Å.

In the sorbent of 9.9% $K_2O+6.5\%$ $Na_2O/\gamma-Al_2O_3$, the molar ratio of K/Na is 50/50. The sorbents with compositions of 5.0% $K_2O+9.9\%$ $Na_2O/\gamma-Al_2O_3$ and 14.5% $K_2O+3.2\%$ $Na_2O/\gamma-Al_2O_3$ were also prepared, their K/Na molar ratios are 25/75 and 75/25, respectively.

Besides the mixture of K and Na, the sorbents with mixed alkali metals of K and Li were also prepared. The K/Li molar ratios in the sorbents of 10.2% $K_2O+3.2\%$ $Li_2O/\gamma-Al_2O_3$, 3.6% $K_2O+5.7\%$ $Li_2O/\gamma-Al_2O_3$ and 16.2% $K_2O+1.0\%$ $Li_2O/\gamma-Al_2O_3$ are 50/50, 25/75, and 75/25, respectively.

The sorbents with mixed alkali metals of K and Cs were also prepared. The K/Cs molar ratios in 8% $K_2O+24\%$ $Cs_2O/\gamma-Al_2O_3$ and 13.1% $K_2O+13.0\%$ $Cs_2O/\gamma-Al_2O_3$ are 50/50, and 75/25, respectively.

The sorbents with mixed alkali metals of K, Na and Li were also prepared. The K/Na/Li molar ratio in the sorbents of 9.8% $K_2O+6.4\%$ $Na_2O+0.62\%$ $Li_2O/\gamma-Al_2O_3$ is 45/45/10.

Example 3

$CO_2$ Sorption/Steam Displacement Fixed Bed Testing for Prepared Sorbents

Simulated flue gas during fixed bed testing contained 4~5.8% $CO_2$ and 8~11.8% $H_2O$ balanced with $N_2$. The fixed bed volume is 100 cc. With the simulated natural gas conditions the flue gas space velocity during screening conditions was 10.56 SCCM/g for 9 minutes and steam regeneration space velocity was 3.74 SCCM/g for 9 minutes. The temperature during adsorption was about 140° C., increasing to approximately 153° C. during sorbent regeneration.

In the single fixed bed, all flow controllers were calibrated to obtain high accuracy in gas flowrates. Whenever a gas is not in use, the flow controller is completely shut to prevent any gas leakage. During adsorption cycle, $N_2$ and $CO_2$ are mixed with steam provided by 500 cc syringe pump. The feed enters the bed by down-flow through a 3-way valve and exits through another 3-way valve. The outlet gas/steam moves through a chiller, and the steam is condensed, collected and measured by an online scale. $N_2$ and $CO_2$ gases pass the chiller and exit to a ZRE $CO_2$ analyzer which measures the breakthrough $CO_2$ concentration. During regeneration cycle, both the 3-way valves are switched to allow steam controlled by 1000 cc syringe pump to enter the bed by up-flow and exit via a different path toward a second chiller. The steam is condensed and collected by online scale for measurement of water out in regeneration. $CO_2$ passes the chiller and is diluted with $N_2$ before entering the ZRE $CO_2$ analyzer which detects the desorbed $CO_2$ concentration. Both syringe pumps are continuously running through a 3-way valve which directs the steam either through the bed or to a by-pass line. The downstream $N_2$ is also used to remove/flush out the condensed water in the exit line at the end of each cycle.

RESULTS AND DISCUSSION $K_2CO_3/Al_2O_3$ sorbent deactivates on stream. CCS tests showed the sorbents usually had high initial $CO_2$ sorption capacities, but they were gradually losing $CO_2$ sorption capacities on stream. Sorbent aging also leads to higher $H_2O/CO_2$ molar ratios. Potassium species agglomeration on the support surface gives rise to hydroxyl groups resurfacing and exposing, which results in more $H_2O$ sorption onto the sorbents.

Figure 3:
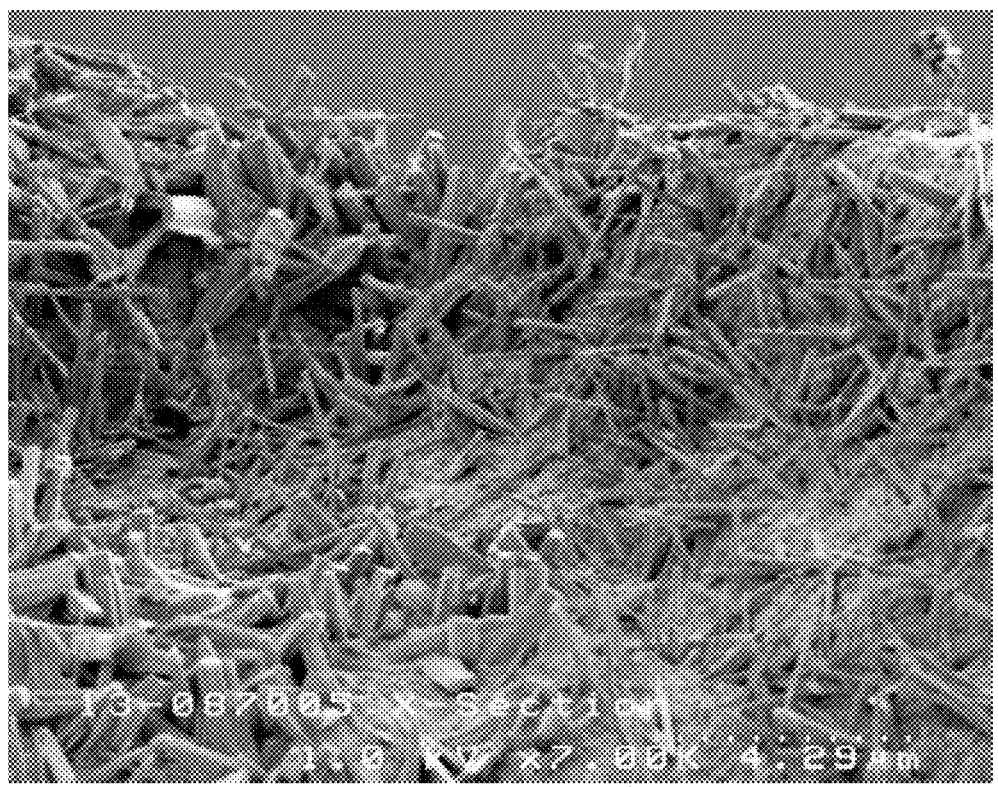
FIG. 3 illustrates the SEM cross-sectional image of spent sorbent of 15.85% $K_2O/\gamma\text{-}Al_2O_3$, for which the sorbents of the disclosure can reduce, in accordance with an exemplary embodiment of the disclosure.
Figure 2:
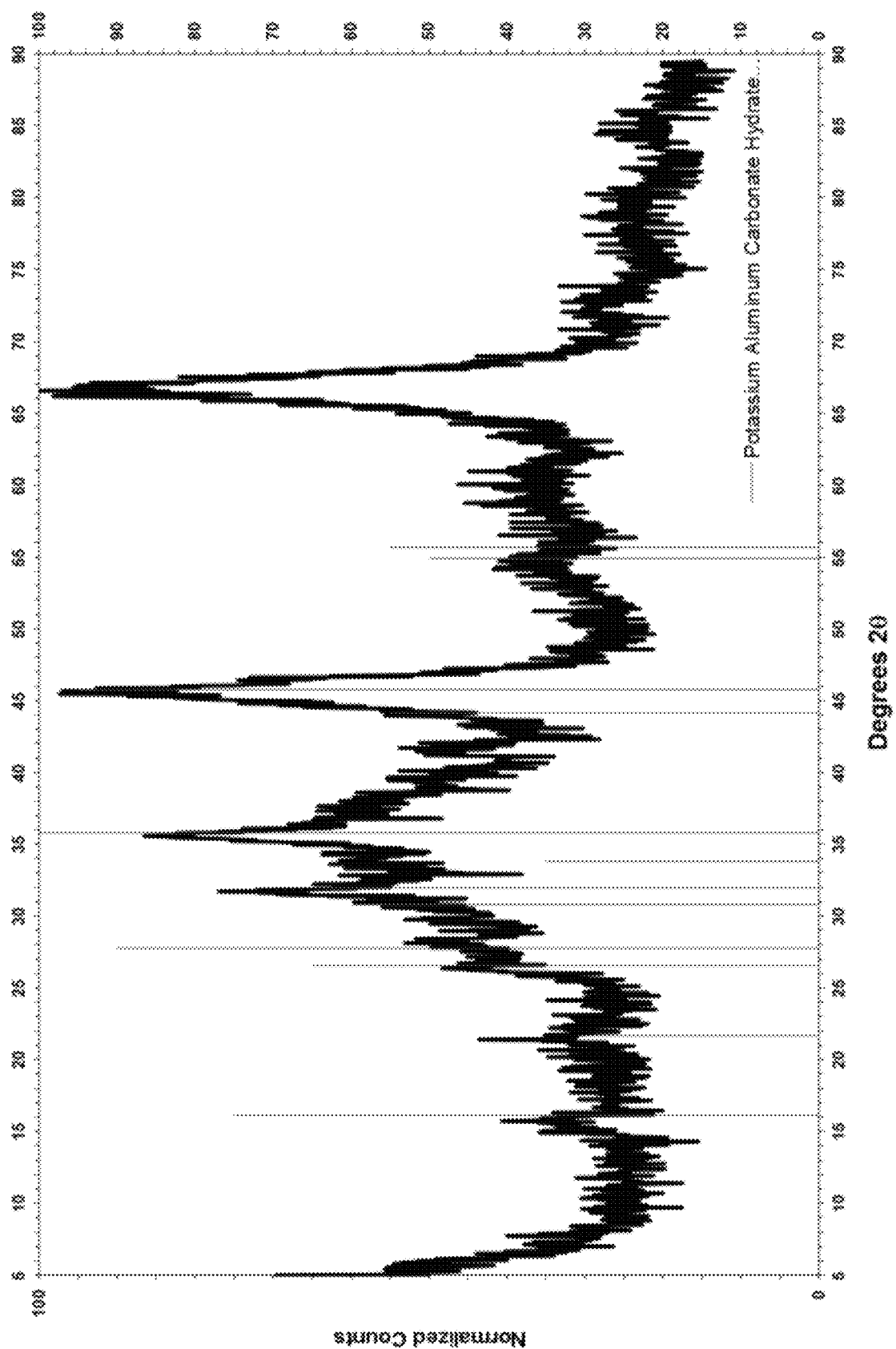
FIG. 2 illustrates the XRD of a spent sorbent of 15.85% $K_2O/\gamma\text{-}Al_2O_3$, for which the sorbents of the disclosure can reduce, in accordance with an exemplary embodiment of the disclosure.

RED in FIG. 2 revealed the formation of potassium aluminate carbonate hydrate $K_2Al_2O_2(CO_3)_2.4H_2O$ on the spent sorbent after 30 days of $CO_2/H_2O$ displacement desorption testing. Under hydrothermal testing condition, $\gamma-Al_2O_3$ can convert to boehmite ($\gamma-AlOOH$). Boehmite is much easier to react with K species to form K aluminate than alumina because of its high reactivity. The poison phase buildup, which can be seen from SEEM image (FIG. 3), reduces sorbent performance.

Figure 4A:
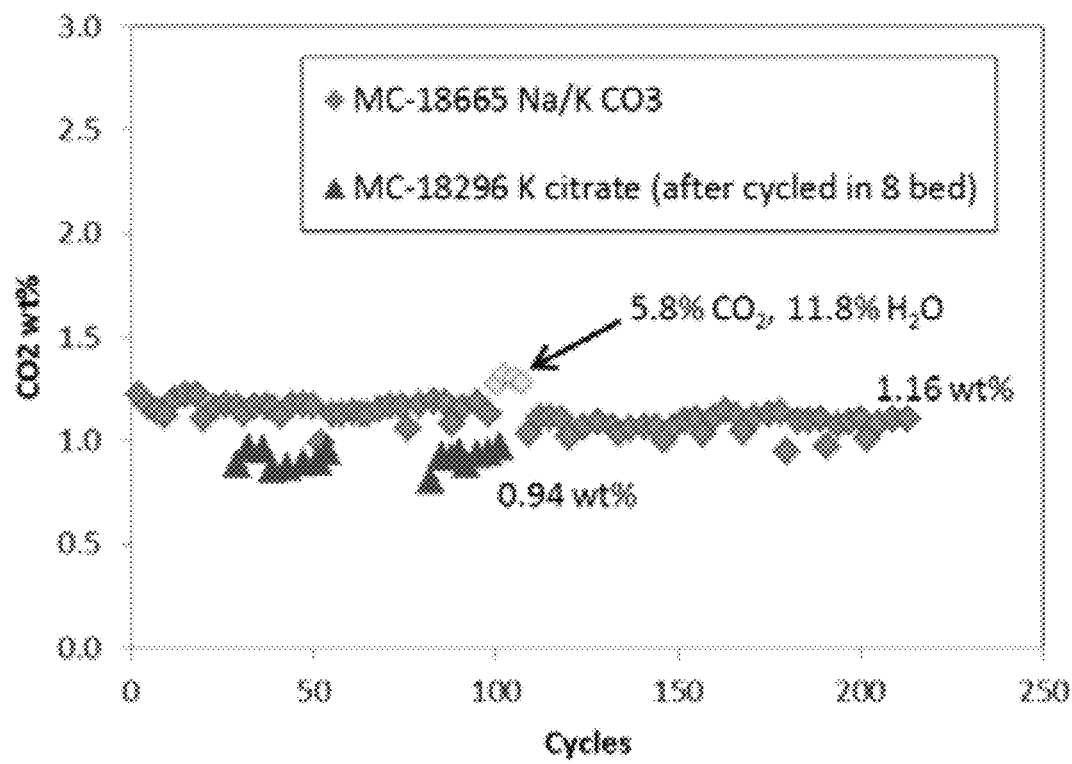
FIGS. 4A and 4B illustrates the CCS testing comparing single and binary alkali metals, in accordance with an exemplary embodiment of the disclosure.
Figure 4B:
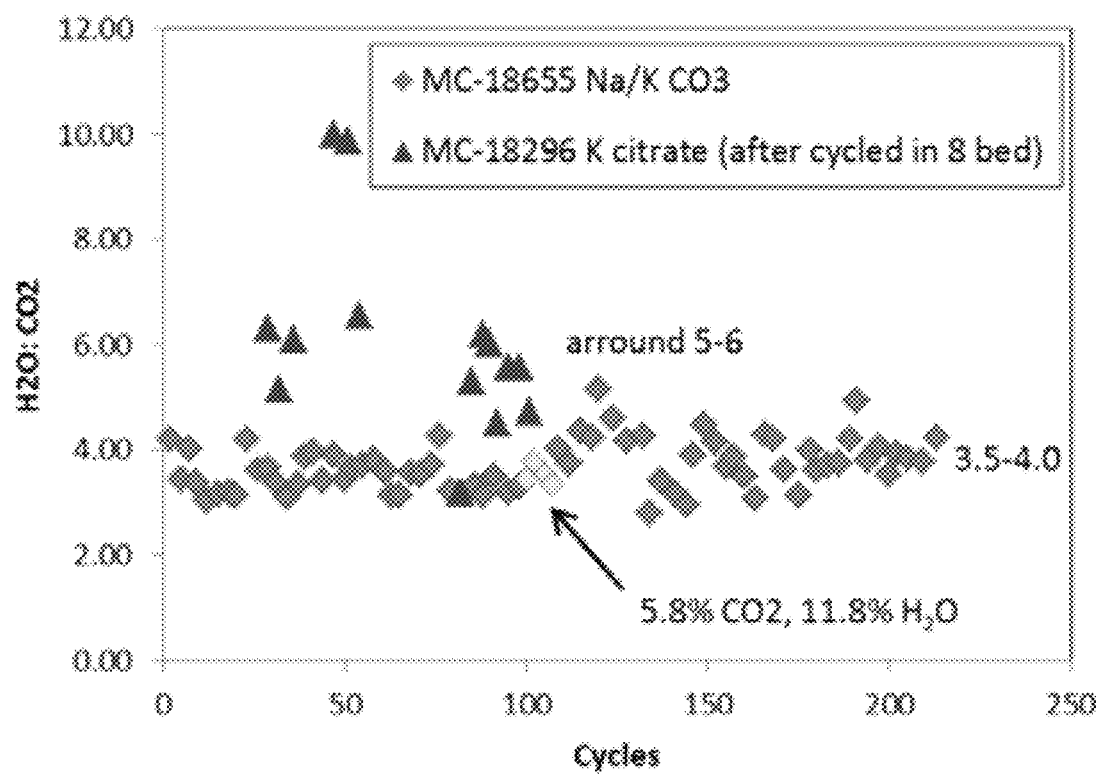

FIGS. 4A and 4B show $CO_2$ sorption capacities and $H_2O/CO_2$ molar ratios, respectively, of two samples tested. The two samples were MC-18665 (9.9% $K_2O+6.5\%$ $Na_2O/Al_2O_3$) and MC-18296 (15.85% $K_2O/Al_2O_3$). The volumes of the sorbents charged in fixed bed were 300 ml. Each cycle was consisted of flue gas sorption and steam regeneration lasting about 33 min. After 200 cycles, the mixed metals (Na+K) sorbent showed stable $CO_2$ sorption capacity of 1.16 wt % and $H_2O/CO_2$ molar ratios of 3.5~4. Compared with the single K sorbent of MC-18296, the sample of MC-18665 (9.9% $K_2O$+6.5% $Na_2O/Al_2O_3$—$NaKCO_3$) has more stable CCS performance, with higher $CO_2$ sorption capacity and lower molar ratio of $H_2O$ to $CO_2$.

Table 1 summarizes the $CO_2/H_2O$ displacement desorption performances of several $CO_2$ sorbents developed and incorporated herein.

TABLE 1

Summary of $CO_2$ Sorbent Development

| | Sorbent Impregnating alkali metal Support | | | | |
|---|---|---|---|---|---|
| | Sorbent A 12% $Na_2O$ $Al_2O_3$ | Sorbent B 15.85% $K_2O$ $Al_2O_3$ | Sorbent C 9.9% $K_2O$ + 6.5% $Na_2O$ $Al_2O$ | Sorbent D 5.4% $K_2O$ + 3.5% $Na_2O$ 10% $K_2O/Al_2O_3$ | Sorbent E 5.4% $K_2O$ + 3.5% $Na_2O$ 10% $K_2O/Al_2O_3$ |
| $CO_2$ wt % loading | 0.56 | 0.81 | 1.03 | 1.07 | 1.14 |
| Molar ratio of $H_2O/CO_2$ | 6.60 | 5.50 | 4.31 | 3.66 | 3.94 |
| Density (g/ml) | 0.60 | 0.48 | 0.53 | 0.62 | 0.7 |

Sorbent A was prepared by extrusion of $Na_2CO_3$ with Versal-700 $Al_2O_3$. $CO_2$ sorption loading was 0.56 wt %, with molar ratio of $H_2O/CO_2$ of 6.60.

Sorbent B was prepared by impregnation of $K_2CO_3$ solution onto alumina support. Higher $CO_2$ sorption capacity was due to higher dispersion of potassium carbonate on $A_2O_3$. Formation of poison phase of potassium aluminate carbonate hydrate gradually reduced $CO_2$ capacity on stream.

Sorbent C was mixed Na+K sorbents, according to this disclosure. Addition of Na carbonate was to interrupt the crystallization of the poison phase K aluminate carbonate hydrate. The similar counterpart phase with Na cations does not exist. Better sorbent performance compared to 2nd generation sorbent, higher $CO_2$ sorption capacity of 1.03 wt % and lower $H_2O/CO_2$ ratio of 4.31.

Sorbent D was prepared by extrusions of $K_2CO_3$ with alumina to preform denser phase of pseudo $KAlO_2$, according to same date and titled HIGH PERFORMANCE $CO_2$/$H_2O$ DISPLACEMENT DESORPTION SORBENTS AND METHODS OF MAKING SAME, herein incorporated by reference in its entirety as if fully set forth below. After extrusion, the 10% $K_2O/Al_2O_3$ was impregnated with $K_2CO_3$ and $Na_2CO_3$ solutions. Stable and high $CO_2$ loading of 1.07 wt % and much low $H_2O/CO_2$ ratio of 3.66 were observed. Also the density of the sorbent was increased to 0.62.

Sorbent E was prepared by extrusions of $K_2CO_3$ with alumina to preform denser phase support of $KAlO_2$, according to this disclosure. After extrusion, the support of 10% $K_2O/Al_2O_3$ was only dried at 250° F. in air before it use as support for Na and K carbonates deposition, according to co-pending provisional application filed on the same date and titled CALCINATION OF $CO_2/H_2O$ DISPLACEMENT DESORPTION SORBENTS, herein incorporated by reference in its entirety as if fully set forth below. Without calcination, more hydroxyl groups on the supports were preserved, which can act as anchoring points for Na and K carbonates dispersions. This leads to higher $CO_2$ loading of 1.14 wt %. Also the density of the sorbent was further increased to 0.70 g/ml, which indicates that $CO_2$ sorption loading per volume of sorbent increased.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

We claim:

1. A mixed alkali metal CCS sorbent, comprising:
   a support made by mixing an aluminum oxide and an alkali metal salt to create a dough, extruding the dough to create an extrudate, drying and calcining the extrudate to create the support, wherein the extrudate is dried at a temperature greater than about 125 degrees C. up to about 500 degrees C.; and
   a combination of alkali metal ions impregnated on the support,
   wherein the combination of alkali metal ions comprises potassium and at least one other alkali metal, and
   wherein the molar ratio of the potassium to the at least one other alkali metal is between about 1:4 and about 4:1.

2. The sorbent of claim 1, wherein the combination of alkali metal ions comprises at least about 10 wt % of the sorbent.

3. The sorbent of claim 1, wherein the combination of alkali metal ions comprises at least about 12 wt % of the sorbent.

4. The sorbent of claim 1, wherein the molar ratio of the potassium to the at least one other alkali metal is about 1:3 to about 3:1.

5. The sorbent of claim 1, wherein the molar ratio of the potassium to the at least one other alkali metal is about 1:2 to about 2:1.

6. The sorbent of claim 1, wherein the at least one other alkali metal comprises lithium or sodium.

7. The sorbent of claim 1, wherein the at least one other alkali metal comprises sodium.

8. The sorbent of claim 1, wherein the at least one other alkali metal comprises two other alkali alkali metals.

9. The sorbent of claim 8, wherein the molar ratio of the potassium to a first other metal salt to a second other metal salt is 4:1:1 to 1:4:1 to 1:1:4.

10. A mixed alkali metal CCS sorbent, comprising
a support made by mixing an aluminum oxide and an alkali metal salt to create a dough, extruding the dough to create an extrudate, drying and calcining the extrudate to create the support, wherein the extrudate is dried at a temperature greater than about 125 degrees C. up to about 500 degrees C.; and a combination of alkali metal ions impregnated on the support, wherein:
the combination of alkali metal ions comprises potassium, sodium, and cesium, and
the molar ratio of the potassium to the sodium to the cesium is 4:1:1 to 1:4:1 to 1:1:4.

11. A mixed alkali metal CCS sorbent, comprising
a support made by mixing an aluminum oxide and an alkali metal salt to create a dough, extruding the dough to create an extrudate, drying and calcining the extrudate to create the support, wherein the extrudate is dried at a temperature greater than about 125 degrees C. up to about 500 degrees C.; and a combination of alkali metal ions impregnated on the support, wherein:
the combination of alkali metal ions comprises potassium, sodium, and lithium, and
the molar ratio of the potassium to the sodium to the lithium is 4:1:1 to 1:4:1 to 1:1:4.

* * * * *